US010232407B2

(12) United States Patent
Crest et al.

(10) Patent No.: US 10,232,407 B2
(45) Date of Patent: Mar. 19, 2019

(54) INSTALLATION FOR SEPARATING AND SINGULATING NON-UNIFORM POSTAL ARTICLES

(71) Applicant: SOLYSTIC, Bagneux (FR)

(72) Inventors: Karine Crest, Etoile sur Rhône (FR); Pierre Campagnolle, Allex (FR); Jacques Petit, Bourg les Valence (FR); Richard Blache, Lemps (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 15/142,370

(22) Filed: Apr. 29, 2016

(65) Prior Publication Data

US 2016/0243590 A1    Aug. 25, 2016

Related U.S. Application Data

(63) Continuation of application No. PCT/FR2015/053545, filed on Dec. 16, 2015.

(30) Foreign Application Priority Data

Dec. 24, 2014 (FR) ...................................... 14 63315

(51) Int. Cl.
*B07C 1/04* (2006.01)
*B25J 15/00* (2006.01)
(Continued)

(52) U.S. Cl.
CPC ............... *B07C 1/04* (2013.01); *B25J 9/0093* (2013.01); *B25J 9/1697* (2013.01);
(Continued)

(58) Field of Classification Search
CPC .... B25J 9/1697; B25J 9/0093; B25J 15/0057; B25J 15/0616; B65G 43/08; B65G 47/14;
(Continued)

(56) References Cited

U.S. PATENT DOCUMENTS

2008/0260890 A1* 10/2008 Di Simone ......... B29C 45/0055
425/556
2014/0316573 A1* 10/2014 Iwatake ................. B25J 9/1694
700/258

(Continued)

FOREIGN PATENT DOCUMENTS

DE            10216771 A1 * 10/2003 ............ B25J 9/0093

*Primary Examiner* — Ronald P Jarrett
*Assistant Examiner* — Ashley K Romano
(74) *Attorney, Agent, or Firm* — Edell, Shapiro & Finnan, LLC

(57) ABSTRACT

An installation for separating and singulating non-uniform postal articles of the small parcel or packet type comprises a platform for temporarily storing a pile of loosely placed postal articles, a vision system adapted to form digital images of the pile of loose postal articles, which pile is static on the platform, a data-processing unit adapted to use these digital images to identify a postal article to be singulated, i.e. an article that has a pickup face that is not covered by any other postal article, the unit being suitable for delivering data indicating the three-dimensional position, the facing direction, and the dimensions of the pickup face, and a pneumatic pickup head of a robotized arm that is controlled on the basis of the data to lift up the postal article to be singulated via its pickup face, and to deposit the postal article on a deposition zone that is off the platform.

4 Claims, 1 Drawing Sheet

(51) Int. Cl.
| | |
|---|---|
| *B25J 9/00* | (2006.01) |
| *B25J 9/16* | (2006.01) |
| *B25J 15/06* | (2006.01) |
| *B65G 43/08* | (2006.01) |
| *B65G 47/14* | (2006.01) |
| *B65G 47/91* | (2006.01) |

(52) U.S. Cl.
CPC ....... *B25J 15/0057* (2013.01); *B25J 15/0616* (2013.01); *B65G 43/08* (2013.01); *B65G 47/14* (2013.01); *B65G 47/1478* (2013.01); *B65G 47/91* (2013.01); *B65G 47/915* (2013.01); *B65G 47/918* (2013.01); *B65G 2201/0282* (2013.01); *B65G 2203/044* (2013.01)

(58) Field of Classification Search
CPC .. B65G 47/1478; B65G 47/91; B65G 47/915; B65G 47/918; B65G 2201/0282; B65G 2203/044; B07C 1/04
See application file for complete search history.

(56) References Cited

U.S. PATENT DOCUMENTS

2014/0341695 A1\* 11/2014 Girtman ................. B65G 67/24
  414/797
2016/0207195 A1\* 7/2016 Eto ........................ B25J 9/1612

\* cited by examiner

INSTALLATION FOR SEPARATING AND SINGULATING NON-UNIFORM POSTAL ARTICLES

CROSS REFERENCE TO RELATED APPLICATIONS

This application is a continuation of International Application No. PCT/FR2015/053545, filed on Dec. 16, 2015, which claims priority under 35 U.S.C. § 119 to Application No. FR 1463315 filed on Dec. 24, 2014, the entire contents of which are hereby incorporated by reference.

FIELD OF THE INVENTION

The present invention relates to an installation for separating and singulating postal articles of the small parcel or packet type.

The installation of the invention is, in particular, designed to be used to feed an automatic postal sorting machine in which the singulated parcels or packets are moved in series and at constant pitch past sorting outlets of the machine, and each of them is directed towards a suitable sorting outlet as a function of the delivery address on the parcel or packet.

BACKGROUND

Solutions for separating and singulating articles are known in which non-uniform articles loaded loosely into a feeder or hopper are poured continuously onto belts, rollers, and other types of mechanical conveyor, and are spread out into single units as they move along said conveyors. The spread-out articles can then be taken one-by-one so as to be put in series on a belt conveyor, for example. That type of spreading-out installation suffers from the drawback of being voluminous.

In the postal field, small parcels or packets are articles that are essentially non-uniform, namely articles that are of a wide variety of dimensions and shapes, and it is important to put them in series at a constant pitch, i.e. with a constant distance between the leading edges of any two consecutive articles, so that each article can be directed automatically and easily towards a respective sorting outlet of a sorting machine.

SUMMARY

An object of the invention is thus to propose an installation for separating and singulating non-uniform postal articles of the small parcel or packet type that is compact, and that makes it possible to put the articles in series at a constant pitch at the inlet of a postal sorting machine.

To this end, the invention provides an installation for separating and singulating non-uniform postal articles of the small parcel or packet type, comprising:

a platform for temporarily storing a pile of loosely placed postal articles;

a vision system adapted to form digital images of the pile of loose postal articles, which pile is static on the platform;

a data-processing unit adapted to use these digital images to identify a postal article to be singulated, i.e. an article that has a pickup face that is not covered by any other postal article, the unit being suitable for delivering data indicating the three-dimensional position, the facing direction, and the dimensions of said pickup face; and a pneumatic pickup head of a robotized arm that is controlled on the basis of said data to take said postal article to be singulated via its pickup face, and to deposit said postal article on a deposition zone that is off the platform;

said installation being characterized in that the pickup head is of variable geometry that is servo-controlled, on each occasion, to the dimensions of the pickup face of the postal article to be singulated.

In this installation, the postal articles are separated one-by-one by the robotized arm down to the last one in the pile of loosely placed articles on the platform. A new pile of postal articles is then formed on the platform and the postal articles in the new pile of postal articles are separated one-by-one as described above. Every time a postal article is taken from the pile of postal articles, the vision system forms images of the pile of postal articles remaining on the platform in such a manner as to determine a new postal article to be taken from the pile of postal articles stored on the platform. The robotized arm can deposit each postal article on a belt conveyor moving at a predetermined constant speed, the robotized arm being synchronized with said belt conveyor so that the articles are placed in series on the belt of the conveyor at a constant pitch.

The installation of the invention may also have the following features:

the pickup head is provided with a plurality of suction cups that are mounted to be individually movable to match the profile of the pickup face.

the pickup head has a main pickup plate with a plurality of suction cups and at least two hinged flaps that are hinged to respective ones of two opposite sides of the main plate, and each of which is also provided with a plurality of suction cups;

the pickup head is controlled to deposit the postal article with its long dimension extending in a certain direction relative to a reference axis, e.g. the longitudinal axis of the belt conveyor.

BRIEF DESCRIPTION OF THE DRAWINGS

The invention is described below in more detail and is shown by the drawing that shows an example of an installation of the invention for separating and singulating small postal parcels or packets. In the drawing.

DETAILED DESCRIPTION

Figure 1:
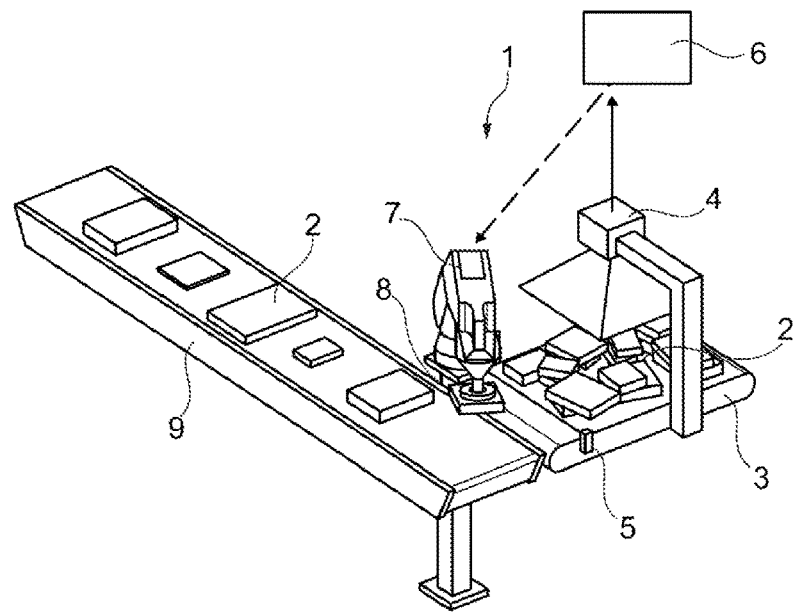
FIG. 1 is a diagrammatic view of the installation of the invention with a robotized arm.

In FIG. 1 of the drawing, the installation 1 of the invention is very suitable for feeding small parcels or packets 2 to a conveyor, for example and not exclusively, in an automatic postal sorting machine in which the parcels or packets 2 are moved in series at constant pitch, e.g. by means of a bin conveyor with bins having their bottoms closed by flaps.

Sorting outlets, e.g. in the form of trays, are disposed under and along the bin conveyor.

Each sorting outlet corresponds to a certain postal delivery destination. As a function of the delivery address that has been read on each singulated parcel or packet, said parcel or packet is unloaded from a bin towards the corresponding sorting outlet by automatically opening the flap in the bottom of the bin when the bin is vertically above said sorting outlet.

In this example, the installation of the invention for separating and singulating postal articles includes a platform for storing a pile of loosely placed postal articles.

In this example, the platform is constituted by a belt conveyor 3 that is adapted to be loaded upstream with a pile of postal articles and to bring said pile of postal articles under a vision system 4 equipped with one or more cameras.

Once the pile of postal articles is under the vision system 4, as can be detected by an optical sensor 5, the belt conveyor 3 is stopped and thus the vision system 4 observes a pile of postal articles that is static.

The vision system is designed to form digital images of this static pile of postal articles, as seen from above in this example.

Image processing is performed on the digital images in a data-processing unit 6 that is also a monitoring and control unit for the robotized arm 7.

The unit 6 is programmed to identify an article to be singulated from the pile of loosely placed particles that is static. Said article to be singulated is the one that has a pickup face (generally a plane rectangular face) that is not covered by any other article in the pile of articles and that is preferably facing in the direction going towards the top of the pile of articles. Said article to be singulated may, for example, be the article that is situated at the top of the pile of articles.

The unit 6 is programmed to act, by three-dimensional (3D) scene analysis, to compute various items of data indicative of the three-dimensional position of said pickup face (3D position of the center of gravity of said pickup face) relative to the platform 3, the facing direction of said pickup face, and the two dimensions (length and width) of said pickup face.

Based on that data, the unit 6 controls the robotized arm 7, which is provided with a pneumatic pickup head 8, so that it picks up the article to be singulated via the pickup face and puts it down on a deposition zone off the platform, which zone is a predetermined location on a flat conveyor 9 in this example.

Figure 2:
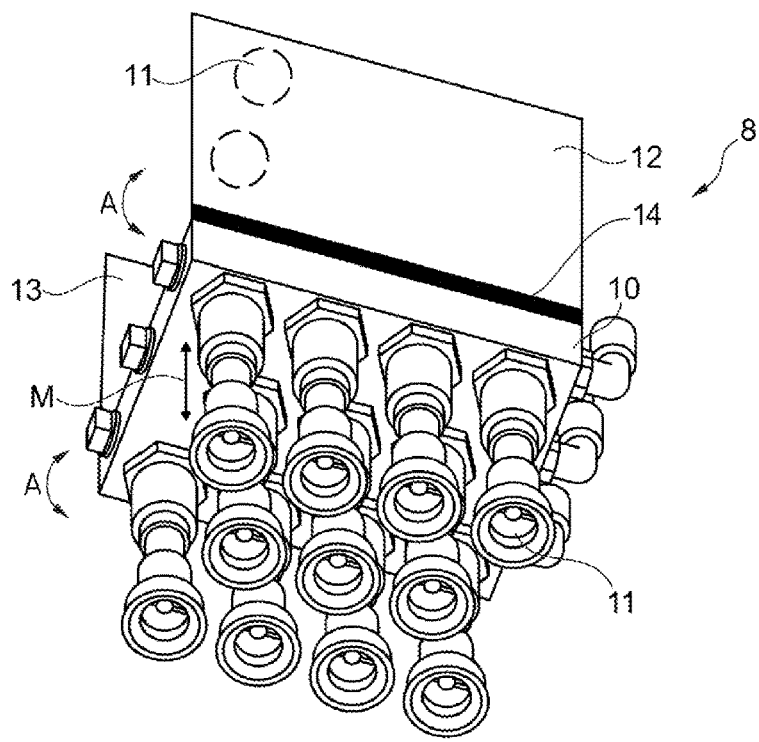
FIG. 2 is a very diagrammatic view of the pickup head of the robotized arm.

In accordance with the invention, the pickup head 8 is a suction pneumatic head that is of variable geometry, i.e. that has a pickup area that is variable. In particular, in FIG. 2, the pickup head has a main plate 10 provided with a plurality of suction cups 11. Said suction cups 11 may be mounted to be individually movable transversely to the plane of the plate 10, as indicated by arrow M in order to adapt to a non-plane profile of the pickup face of the article to be singulated.

At least two hinged flaps (shown symbolically at 12 and 13), each of which is equipped with a plurality of suction cups, such as 11, may be hinged 14 on two opposite sides of the main plate 10 so that the pickup area of the head can be servo-controlled to the dimensions of the pickup face of the article to be singulated by extending or by raising each flap individually as indicated by arrow A, thereby improving the picking up of the article to be singulated.

More particularly, the article to be singulated may be picked up by using the main plate 11 of the pickup head, or by using the main plate 11 and one flap 12 as extended (with the other flap being raised), or indeed by using the main plate 11 and both flaps 12, 13 as extended.

On the basis of the data indicating the facing direction and the dimensions of the pickup face, the unit 6 is suitable for taking hold of the article to be singulated while angularly positioning the main plate 11 along the long length of the pickup face of said article, and for depositing said article while angularly positioning the long length of its pickup face along the longitudinal axis of the flat conveyor 9.

In addition, the unit 6 is suitable for positioning the center of gravity of the main plate 10 of the pickup head to coincide with the center of gravity of the pickup face of the article to be singulated and to have said article deposited by the robotized arm on a synchronization reference on the flat conveyor 9 so as to maintain a constant pitch between two consecutive articles on said flat conveyor.

What is claimed is:

1. An installation for separating and singulating non-uniform postal articles of the small parcel or packet type, comprising:
   a platform for temporarily storing a pile of loosely placed postal articles;
   a vision system adapted to form digital images of the pile of loosely placed postal articles while the pile is static on the platform;
   a data-processing unit adapted to use the digital images to identify a postal article to be singulated, wherein the postal article to be singulated has a pickup face that is not covered by any other postal article, the data-processing unit being configured to deliver data indicating a three-dimensional position, a facing direction, and dimensions of the pickup face; and
   a robotized arm with a pneumatic pickup head, the robotized arm and pneumatic pickup head being controllable on the basis of the data to take the postal article to be singulated via its pickup face, and to deposit the postal article on a deposition zone that is off the platform;
   wherein the pneumatic pickup head includes a pickup area with a variable geometry that is controllable via servo-controllers based on the dimensions of the pickup face of the postal article to be singulated;
   wherein the pickup head comprises a main pickup plate with a plurality of suction cups mounted to be individually movable transversely to the plane of the main pickup plate in order to adapt to a non-plane profile of the pickup face of the article to be singulated based on the data indicating the three-dimensional position, the facing direction, and the dimensions of the pickup face, and further comprises at least one hinged flap that is hinged to one of two opposite sides of the main plate, the at least one hinged flap also provided with a plurality of suction cups mounted to be individually movable transversely to the plane of the hinged flap so that the pickup area of the head can be servo-controlled to the dimensions of the pickup face of the article to be singulated by extending or by raising the flap and by individually moving one or more suction cups transversely to the plane of the hinged flap in order to adapt to a non-plane profile of the pickup face of the article to be singulated based on the data indicating the three-dimensional position, the facing direction, and the dimensions of said pickup face.

2. An installation according to claim 1, wherein the postal article includes a long dimension and wherein the pickup head is controlled to deposit the postal article with its long dimension extending in a certain direction relative to a reference axis.

3. An installation according to claim 1, wherein the platform includes a belt conveyor, and wherein the data-processing unit is configured to stop the belt conveyor when the pile is located under the vision system.

4. An installation according to claim 3, further comprising an optical sensor arranged to detect when the pile is located under the vision system.

* * * * *